3,475,230
DESCALING PROCESS AND MATERIAL
Donald E. Carter, Chattanooga, Tenn., assignor to Combustion Engineering, Inc., Windsor, Conn., a corporation of Delaware
No Drawing. Filed Dec. 12, 1966, Ser. No. 600,756
Int. Cl. C23g 1/00
U.S. Cl. 148—13.1    8 Claims

ABSTRACT OF THE DISCLOSURE

This invention relates to a method and material for use in the heat treating of metals to inhibit the formation of scale and to remove scale and more particularly to remove scale during quenching to increase the rate of heat transfer and thus the rate of cooling and to produce a scale-free product. The material employed is a salt mixture, preferably sodium and potassium chloride, together with a refractory and water. This material is coated on the metal prior to heating and it spalls or peels from the metal primarily upon quenching, taking scale along with it.

BACKGROUND

When metals are heat treated, there is normally a relatively thick oxide scale formed in addition to any oxide film which may have already been present. This scale formation has at least three undesirable aspects: (1) it represents the destruction of a portion of the metal at the surface of the article being treated; (2) it reduces the rate of cooling of the article during quenching; and (3) the scale must usually be removed for subsequent processing.

The hardening of metals or alloys, with which this invention is primarily concerned, depends upon the rapid cooling of the metal from an elevated austenitizing temperature such that transformation of the austenite takes place at a sufficiently low temperature so as to form martensite. The normal hardening process is then completed with a tempering step. If the cooling rate is not sufficiently rapid, some transformation to bainite, pearlite, or ferrite may take place with a corresponding decrease in the percentage of martensite produced and the hardness developed. The scale pre-existing on the metal articles or the scale formed during heating acts as an insulating material during quenching, thus reducing the rate of heat transfer. It is therefore highly advantageous to have this scale removed prior to or immediately upon immersion into the quenching bath.

An object of the present invention is therefore to provide a means and material for removing scale from metals.

Another object of the present invention is to provide a technique for increasing the rate of heat transfer from metals during quenching in a heat treating process.

A more specific object of the invention is to provide a material for coating articles to be heat treated which will serve to remove scale from the articles, to increase the rate of cooling during quenching and to produce heat treated articles which are scale free.

Other objects and advantages of the invention will be readily apparent from the following detailed description.

DESCRIPTION OF THE INVENTION

The present invention is carried out by applying to the metal articles which are to be heat treated, a coating of material which will adhere to the metallic surface and remain intact during the heat treating process and which will protect the metal from oxidation and scale formation at the temperatures normally encountered during heat treating. This coating must be easily applied and economical enough to warrant its use. The coating must also be capable of spalling off the metal article, preferably upon quenching, such as by having a coefficient of expansion significantly different from that of the metal. The coating must also cling to or combine with any oxide film or scale material already on the surface and must carry this film or scale along with it when it spalls off. The metal will then be left relatively clean and free of heat treat scale. The term metal as employed in this description is intended to include alloys.

It has been found that the objects of the present invention are achieved by applying a coating to the metal surface prior to heat treating containing a mixture of alkali metal salts, a refractory cement or mortar material, and water. The alkali metal salts which are employed are sodium and potassium chloride which together act as a fluxing agent at heat treating temperatures. This salt flux, which is molten at these temperatures of 1150° F. to 1650° F., prevents the oxidation of the surface metal and associates with the scale materials, FeO, $Fe_2O_3$, and $Fe_3O_4$, such that the scale will spall off with the salt coating upon cooling. The mechanism by which this association apparently comes about is by the salt flux actually taking iron oxide scale materials into solution although the present invention is not to be limited by any theory of operation. It has been found that both sodium and potassium chloride are necessary in the salt mixture to provide an effective scale removing coating. The optimum ratio of these two salts in the salt mixture is 45 percent potassium chloride and 55 percent sodium chloride although this ratio may be varied as pointed out hereinafter.

The refractory in the coating composition functions as an adhesive or bonding material to hold the salt mixture together and onto the metal surface. The refractory also serves as a shield to protect the molten salt mixture adjacent the metal surface from the furnace gases which might have an adverse effect upon the salt and its reactions with the scale. The refractory further acts to form the coating into a hard mass which will crack or spall upon cooling from heat treating temperatures and thus peel from the metal surface. A suitable refractory material for use in the present invention is an aluminum silicate base refractory having the following approximate formulation in weight percentage:

CHEMICAL ANALYSIS

| | Percent |
|---|---|
| $SiO_2$ | 41.3 |
| $Al_2O_3$ | 49.08 |
| $Fe_2O_3$ | .2 |
| Alkali | 3.4 |
| Ign. loss | 6.0 |

Such a refractory is marketed, for example, by the Refractory and Insulation Corporation under the trade name "Super #3000" as a thick paste containing about 16 to 20 percent water, but the invention is not limited to this specific refractory formula. The only requirements that the refractory should exhibit are: that it be capable of acting as a bonding agent, that it form a suitable hard coating together with the salt, and that it should be compatible with the action of the salt mixture on the scale. The refractory should not contain excessive quantities of alkali or other chemicals which might adversely affect the salt and the fluxing action of the salt with the scale during the heat-up.

Although the ratio of potassium to sodium chloride in the salt mixture is not critical and although any ratio of the two salts will exhibit some degree of effectiveness, the practical limits for an effective salt mixture for use in the coating are as follows in weight percentage:

| | Percent |
|---|---|
| Potassium chloride | 30–55 |
| Sodium chloride | 45–70 |

The amount of refractory which is contained in the coating should not vary extensively since if there is too much, there will be insufficient salt adjacent the metal surface to function properly; and if there is too little refractory, there will not be a proper bond. The optimum ratio of refractory to salt may vary somewhat depending upon the type of refractory used as well as the various other conditions existing in the particular heat treating situation. An example of practical ranges for the salt and refractory constituents employing a 45 percent potassium chloride and 55 percent sodium chloride salt mixture and the above-mentioned aluminum silicate refractory paste with about 18 percent water is as follows in weight percentage:

| | Percent |
|---|---|
| Salt mixture | 63–80 |
| Refractory (wet basis) | 20–37 |

Additional water is added to this mixture in an amount required to give the proper consistency for application to the work piece. An example of a specific formulation to yield one gallon of mixture is as follows:

| | Pounds |
|---|---|
| Potassium chloride | 1.35 |
| Sodium chloride | 1.65 |
| Aluminum silicate refractory paste | 1.25 |
| Water to make 1 gallon. | |

It is obvious that a dry refractory material could be employed rather than the wet pasty refractory and the total amount of water added later. The relative percentages of materials would change accordingly as follows:

| | Percent |
|---|---|
| Salt mixture | 67–83 |
| Refractory (dry basis) | 17–33 |

The first step in the coating and heat treating procedure is to free the metal surface of any grease, loose dirt, loose scale, or other material which might interfere with the coating of the mixture on the metal or the action of the salt on the scale. The coating mixture is thoroughly mixed to obtain a uniform slurry and it is maintained in this mixed condition throughout the coating process. The coating may be applied to the metal in any desired manner such as by brushing, spraying, or dipping. The consistency of the slurry may have to be adjusted by adding more or less water depending upon the method of application selected. It may be desirable and necessary, for instance, to thin the slurry with additional water when spraying. Regardless of the technique employed to apply the coating, it is necessary that sufficient material be applied to interact with the scale and to protect the metal from further oxidation. As a general indication, the coating should be about half as thick as the scale formation on the metal.

After the coating has been applied, it is allowed to dry before introducing the work piece to the heat treating furnace. Drying time is usually from 15 to 20 minutes. If the coating is still wet upon introduction into the heat treating at 1200° F., blistering may occur. However, this may tend to take care of itself by self-healing due to the melting of the salts. The work piece is then heated the required length of time in the furnace and then cooled. Although cooling according to the present invention is preferably carried out by water quenching, the invention also contemplates other liquid or fluid quenching including air quenching and furnace quenching. The term quenching is intended to include all such forms of cooling. The most satisfactory release of the coating and scale from the metal is achieved, however, with the water quenching. The coating and scale release from the metal work piece begins upon removal from the heat treating furnace, but the bulk of the peeling occurs upon the initial insertion of the piece into the water quenching bath. This is, of course, due to the rapid cooling and contraction of the coating as contrasted to the rate of cooling and contraction of the metal.

As an optional feature of the present invention, a quantity of boric acid or sodium tetraborate, $Na_2B_4O_7$, or both may be added to the slurry mixture to promote the salt attack on the iron oxides. These boron compounds aid in the fluxing action. The amount of these materials added may be about 3 percent by weight of the slurry although this figure is not by way of limitation.

An added effect which may be obtained from the salt coating is that the salts which go into solution upon water quenching tend to reduce the duration of the vapor blanket stage. This, of course, would increase the rate of cooling because of better heat transfer.

I claim:

1. A descaling coating composition for use in heat treating consisting essentially of 67–83 percent by weight of alkali metal salts and 17–33 percent by weight of an aluminum silicate based refractory material on the dry basis together with sufficient water to yield a desired consistency, said alkali metal salts consisting essentially of from 30–55 percent KCl and from 45–70 percent NaCl by weight.

2. A descaling coating composition for use in heat treating consisting essentially of 67–83 percent by weight of a salt mixture of KCl and NaCl and 17–33 percent by weight of bonding refractory material on the dry basis together with sufficient water to yield a desirable consistency, said refractory material being compatible with said salt mixture and forming a hard coating with said salt mixture.

3. A descaling coating composition as recited in claim 2 wherein said salt mixture consists essentially of from 30–55 percent KCl and from 45–70 percent NaCl by weight.

4. A method of heat treating a metal member comprising the steps of applying to the surface of said member a coating of descaling material consisting essentially of a salt mixture containing KCl and NaCl and a bonding refractory cement and water, said refractory cement being compatible with said salt mixture and forming a hard coating with said salt mixture, heating said member with said coating thereon above the critical heat treating temperature for the required length of time and immersing said heated member with said coating thereon into a quenching medium whereby said coating will spall from said member together with any scale from said member.

5. A method of heat treating as recited in claim 4 wherein said salt mixture consists essentially of from 30–55 percent KCl and from 45–70 percent NaCl by weight.

6. A method of heat treating as recited in claim 5 wherein said refractory cement contains about from 16–20 percent water and wherein said salt mixture and refractory cement and water are present in said coating material in the ratio of about 3 pounds of salt mixture to 1.25 pounds of refractory cement with sufficient water to produce 1 gallon of material.

7. A method of heat treating as recited in claim 6 wherein said refractory cement is an aluminum silicate based refractory material.

8. A method of heat treating as recited in claim 5 wherein said coating of descaling material further contains a material selected from the group consisting of boric acid and sodium tetraborate.

References Cited

UNITED STATES PATENTS

| | | | |
|---|---|---|---|
| 2,121,606 | 6/1938 | McCulloch | 148—22 X |
| 2,806,801 | 9/1957 | Leston | 148—22 X |
| 2,975,084 | 3/1961 | Jominy et al. | 148—26 |
| 3,000,755 | 9/1961 | Hanink et al. | 147—27 X |
| 3,178,322 | 4/1965 | Schneider | 148—22 |
| 3,372,066 | 3/1968 | Quaas | 148—26 X |

CHARLES N. LOVELL, Primary Examiner

U.S. Cl. X.R.

106—55, 63, 286; 148—27